United States Patent
Guggenheim et al.

(10) Patent No.: US 9,414,547 B2
(45) Date of Patent: Aug. 16, 2016

(54) METHODS TO GROW, DELIVER, AND PLANT YOUNG TREES IN A REMOVABLE TUBULAR CONTAINER

(71) Applicants: Thomas Link Guggenheim, Mount Vernon, IN (US); Roy Ray Odle, Mount Vernon, IN (US)

(72) Inventors: Thomas Link Guggenheim, Mount Vernon, IN (US); Roy Ray Odle, Mount Vernon, IN (US)

(73) Assignee: Thomas L. Guggenheim, Mount Vernon, IN (US)

( * ) Notice: Subject to any disclaimer, the term of this patent is extended or adjusted under 35 U.S.C. 154(b) by 74 days.

(21) Appl. No.: 13/754,847

(22) Filed: Jan. 30, 2013

(65) Prior Publication Data

US 2014/0208645 A1  Jul. 31, 2014

(51) Int. Cl.
*A01G 9/02* (2006.01)
*A01G 1/00* (2006.01)
*A01G 13/00* (2006.01)
*A01G 9/10* (2006.01)

(52) U.S. Cl.
CPC ............ *A01G 1/001* (2013.01); *A01G 13/0243* (2013.01); *A01G 9/026* (2013.01); *A01G 9/108* (2013.01)

(58) Field of Classification Search
CPC ......... A01G 9/02; A01G 9/026; A01G 9/021; A01G 9/022; A01G 9/10; A01G 9/00; A01G 9/102; A01G 2009/003; A01G 23/04; A01G 13/0237
USPC ............. 47/65.5, 65.7, 65.8, 66.1, 66.6, 66.7, 47/73, 74, 76, 77, 78
See application file for complete search history.

(56) References Cited

U.S. PATENT DOCUMENTS

| | | | |
|---|---|---|---|
| 3,164,507 A * | 1/1965 | Masuda | 156/197 |
| 3,722,139 A | 3/1973 | Pelton | |
| 3,889,416 A | 6/1975 | Bergeron | |
| 3,965,617 A | 6/1976 | Kawase | |
| 4,008,544 A | 2/1977 | Rupprecht et al. | |
| 4,016,678 A | 4/1977 | Larsen | |
| 4,031,832 A | 6/1977 | Edwards | |
| 4,050,188 A | 9/1977 | Wingerden | |
| 4,057,932 A | 11/1977 | Spencer | |
| 4,156,395 A | 5/1979 | Edwards et al. | |
| 4,167,911 A | 9/1979 | Masuda et al. | |
| 4,777,764 A | 10/1988 | Wingerden | |
| RE32,808 E | 12/1988 | Wingerden | |
| 4,939,865 A * | 7/1990 | Whitcomb et al. | 47/77 |
| 5,099,607 A * | 3/1992 | Lawton | 47/73 |
| 5,142,821 A | 9/1992 | Bell | |
| 5,339,566 A | 8/1994 | Cormier | |
| 5,359,809 A | 11/1994 | Johnson | |
| 5,383,302 A | 1/1995 | Hill | |
| 6,138,404 A | 10/2000 | King et al. | |
| 6,141,903 A | 11/2000 | Mancini | |
| 6,195,938 B1 | 3/2001 | Kay | |
| 6,263,613 B1 | 7/2001 | King et al. | |
| 6,405,481 B1 | 6/2002 | Bautner | |
| 6,546,670 B2 | 4/2003 | Bautner | |
| 7,117,634 B2 | 10/2006 | Pelton | |
| 7,272,911 B2 | 9/2007 | Gatliff | |

(Continued)

*Primary Examiner* — Trinh Nguyen (57) ABSTRACT

Methods to grow, provide and plant a young tree using a novel removable tubular container are disclosed. The container promotes the growth of a well formed protected root structure that minimizes transplant shock at the time the young tree is moved and permanently planted. The removable container and methods described provide for a fast growing inexpensive tree that is easily planted by a single person.

13 Claims, 9 Drawing Sheets

(56) References Cited

U.S. PATENT DOCUMENTS

| | | |
|---|---|---|
| 7,308,775 B1 | 12/2007 | Lovelace |
| 2002/0073616 A1 | 6/2002 | Pelton |
| 2002/0108305 A1 | 8/2002 | Bautner |
| 2004/0025435 A1 | 2/2004 | Stoever |
| 2006/0026897 A1 | 2/2006 | Glover |
| 2006/0150503 A1 | 7/2006 | Kosderka et al. |
| 2006/0150504 A1 | 7/2006 | Kosderka et al. |
| 2007/0079551 A1 | 4/2007 | Tamura et al. |
| 2008/0222950 A1 | 9/2008 | Rooker |
| 2009/0025290 A1 | 1/2009 | Trabka |
| 2009/0107370 A1 | 4/2009 | Ostlie |
| 2011/0041402 A1 | 2/2011 | Teasdale |

* cited by examiner

METHODS TO GROW, DELIVER, AND PLANT YOUNG TREES IN A REMOVABLE TUBULAR CONTAINER

BACKGROUND OF THE INVENTION

There is a need for better methods to grow and market small trees. There are two primary methods to grow small trees for transplanting: in containers and in the ground. In the container method 4 to 6 year old trees are grown and sold in shallow containers that are open on the top and have a bottom, and are 8 to 20 inches in depth with a diameter of 8 to 20 inches. These trees are typically 6 feet to 12 feet tall at time of sale. The root structure present in the container is frequently compromised. The root mass may be too small to fully anchor the tree in the soil when permanently planted, requiring that the planted tree be supported by stakes and constraints to prevent leaning of the tree, and to encourage proper root development. Trees grown in these containers frequently develop dense tangled root structures. When planted such trees become 'root-bound', wherein the roots do not develop normally to provide adequate anchoring or nourishment for the tree above ground. When planted, root-bound trees will frequently develop girdling roots. A girdling root circles the base of the tree and can choke nutrient flow from the roots up to the limbs of the tree, and result in the eventual death of the tree.

Commercial nurseries also grow trees in the ground for 3 to 10 years, or longer. These trees are then dug up as a root ball, either with a hydraulic tree spade or by hand, and the root ball structure and roots trimmed with pruning tools. A significant portion of the root structure can be lost in this process. The root ball is either wrapped in burlap or the like or placed in a container with a closed bottom. The root ball is typically small compared to the size of the tree growing from the root structure, particularly if the digging is done manually. Growing and selling trees in this manner has several drawbacks such as the need for significant acreage, the risk of transplant shock (i.e., death of the tree after permanent planting), the amount of labor needed to dig the tree from the nursery and to replant the tree, the need for expensive equipment to move larger trees, the damage done to the root structure when digging the tree from the nursery, the need for supports and anchors for larger trees once planted, and an inadequate root system to provide nutrients to the tree after planting. Typically, trees grown and planted in this manner may take 2 to 3 years before the root structure is re-developed enough to encourage rapid growth of the tree above the ground.

Another method to grow trees in the ground for marketing is the bare-root method. In this method, trees are grown from seed or germinated seed in well tilled aerated soil. The trees are grown in close proximity to one another. The trees are grown for 1 to 3 years and then dug up with mechanized equipment in the spring or late fall. The soil is removed from the root structure and the root structure is keep moist. Typically, the bare root trees are bundled together in quantities up to 100. The bare tree roots are wrapped with moist packing and are immediately delivered to a customer. Drawbacks of this method include the possibility of the roots drying out before planting causing death, damage to the microscopic root structure which can cause transplant shock, and need for greater expertise when planting. Some of these drawbacks can be overcome in large scale operations through the use of specialized techniques and/or equipment. However, in small scale operations (200 trees or less), these problem persist.

Therefore, there exists a need for robust, cost effective and environmentally friendly methods to raise and market small trees that are 2 to about 6 feet tall.

SUMMARY OF INVENTION

The invention provides methods for growing tree seeds, germinated seeds, or tree seedlings in a recyclable removable tubular container of optimal dimensions and construction, containing a suitable soil, to provide a young tree with a well developed untangled root system that is conveniently manually planted. Once replanted, the root system is sufficiently developed to supply the nutritional needs of the tree above ground enabling rapid growth of the tree above ground.

In some embodiments, a method of growing a tree with a well-developed untangled root system comprises the steps of providing a tubular container with an open top end and an open bottom end, standing the container upright on a porous media, partially filling the container with loosely packed soil, planting a tree seed, a germinated seed, or a tree seedling in the soil, and adding the correct amount of soil to cover the seed or seedling so that the height of the soil is about 2 inches to 12 inches from the top of the container. The container may be held under growth conditions until the tree root system extends at least half of the height of soil held in the container. In some embodiments of the invention, the porous media is soil, and the root system will extend the length of the container and grow into the soil media.

The tubular container may be formed by overlapping opposed edges of a flexible sheet of material and fastening the overlapped edges with a removable fastener such as a staple, a plastic weld, a cable tie, a rope, a wire, a lace, a grommet, a tape, or a screw. In some embodiments, the material is made of an organic polymer or biodegradable material. In some embodiments, the fastener may be a lace, and the tubular container may be formed and fastened by punching a plurality of evenly spaced holes along the opposed edges of a rectangular shaped flexible sheet of material, overlapping the edges modified with the plurality of holes and aligning the opposed plurality of holes, and threading the lace through the fastening holes. In other embodiments, the tubular container may be formed by extrusion.

In some embodiments, the tree is allowed to grow for a period of time wherein the roots grow into the porous media upon which the tube stands. The tubular container is separated from the surface of the porous media without significantly disturbing the soil cylinder inside the tubular container. Any roots that protrude from the bottom of the tubular container may be pruned flush with the bottom of the tubular container. A hole is dug at the permanent planting site that is about 2 inches wider in diameter than the tubular container and is as deep as the soil cylinder inside the tubular container. The fasteners used to construct the tubular container are removed, and the soil cylinder may be supported with the sheet of material used to construct the tubular container, and the soil cylinder supported by the sheet are inserted into the hole simultaneously. The bottom of the soil cylinder rests on the bottom of the hole. The material used to make the tubular container may be removed from the hole, and the annular space between the sides of the hole and soil cylinder containing the root structure is filled in with soil. Water is added to the hole to settle the soil and more soil is added until the annular space is filled.

DETAILED DESCRIPTION OF INVENTION

Several terms used to describe the invention are defined below.

'Sheet' is defined as a rectangular piece of material made of an organic polymer (a plastic) or biodegradable material that is 1 to 1000 mils thick.

'Seedling' is defined as a tree that has germinated from a seed and is comprised of a root system and a living stalk that is 1 week to 3 years in age from the time of seed germination.

'Soil surface' and 'soil media' is to mean an area of soil that is suitable from growing trees.

'Porous media' means a surface that can hold water and is capable of supporting the root growth of a tree.

'Clay' is a broad term that means a phyllosilicate mineral containing calcium, sodium, magnesium, aluminum, potassium and/or iron. It may contain some metal oxides and/or bio-based organic material. 'Clay soil' is rich in clay particles.

'Soil' can include clay soil, humus, black dirt, or peat moss, sand, or mixtures thereof.

'Staked tree' is to mean that 2 to 4 wooden or metal stakes are driven into the ground within 1 to 3 feet of a tree truck. The tree trunk is then tied to the stakes with wire or rope to keep the tree erect. The rope or wire that contacts the tree trunk is wrapped with a suitable material such that the bark of the trunk will not be damaged. Suitable materials for this purpose are cloth or an insulating rubber.

A 'bulb planter' is to mean a hand held tool that removes soil from the ground or from a container that holds soil. It is conical in shape, with a handle on one end, open on the other end, with a hollow interior cone, anywhere from about 4 inches to about 10 inches in length. When the open end of the tool is forced into the soil by holding the handle and pushing down, soil is forced into the interior of the conical shaped tool. The tool containing the soil is then removed creating a cavity in the soil surface.

'A container of tubular form' or 'a removable container of tubular form' or a 'tubular container' means a container wherein the length of the container is 1 to 10 times that of the average diameter, and the cross-sectional shape is any geometric shape, such a circle, oval, square, pentagon, hexagon, triangular, or irregularly shaped figure, that is open on the top and open on the bottom.

'Slightly oval' is defined where the radius of the shortest diameter of the oval is at least 80 percent of the longest diameter of the oval.

'Circular' is to mean the shape of a circle, or slightly oval in shape.

Disclosed herein is a method of growing small trees. The method comprises planting a tree seed, a germinated tree seed or a bare root tree seedling in a removable tubular container having an open top end and an open bottom end and filled with soil. The tubular containers are stood on a porous medium capable of supporting root growth and the trees are allowed to grow to a height of 2 to 5 feet, sometimes taller. The containers are then separated from the surface of the porous media, typically a soil media, and any roots that protrude from the bottom of the container can be pruned flush with the bottom of the container. A cylindrical hole is dug at the desired permanent planting site that is as deep as the soil cylinder inside the tubular container and about 2 inches wider in diameter than the soil cylinder. The container can be removed before placing the soil cylinder in the hole. In some embodiments the container still containing the soil cylinder can be placed in the hole, the removable container unfastened, and the material used to make the container removed from the hole. The hole is then filled with soil to complete the planting of the tree.

The growing methods disclosed herein provide a well developed untangled root system. By virtue of the well developed root, a tree grown by these methods to a height of 2 to 5 feet (or more) once planted at the desired location, will overtake a more expensive 6 to 12 foot tree grown in a 5 to 10 gallon container with a closed bottom, or a tree grown in the ground, then dug from the ground, to provide a similarly sized tree with a burlap-wrapped root ball, planted at the same time as the tree raised in the tubular container.

Small trees, 2 to 5 feet in height, sometimes taller, grown in tubular containers offer other advantages. The trees can be grown in close proximity, allowing more efficient watering of the trees, and for efficient application of nutrients, fungicides, and insecticides. The space necessary to grow the trees is minimized. The methods do not require the need for expensive equipment such as a hydraulic tree spade to remove the tree from a tree nursery and to replant the tree. The method provides a small tree with a well developed root structure which is easily kept moist reducing the chance of transplant shock. The trees in the removable tubular containers, which typically weigh less than 30 kg, are easy transport and plant by a single person without the need for expensive equipment. The long root structure eliminates the need to stake the tree after permanent planting. The root structure of the marketed tree, once planted is adequate to provide nutrients to the tree above ground, thus allowing immediate growth of the tree when planted at the right time of year. Since girdling roots do not form while the tree is growing in the tubular container standing on a porous media, the propensity to form girdling roots after permanent planting is greatly minimized, due to the nature of the well developed untangled root structure. The material used to make the container to grow the tree can be recycled. These advantages result in a low cost marketable healthy tree.

The tubular shaped container can be fabricated from a rigid yet flexible rectangular sheet of an organic polymer or biodegradable material of desired dimensions. The profile of the sheet may be smooth, ridged, corrugated, or of any texture that still allows formation of the tubular container. The length to width ratio of the rectangular material can be 0.30 to 3.5. The sheet of rectangular material is rolled such that 2 opposed edges of the rectangle are over-lapped to afford a tubular form and the contacting overlapping edges are fastened together with a removable fastener to maintain the shape of a tubular container, such that the resulting tubular container will have a length to diameter ratio of about 1 to 1, to about 10 to 1. The container is open on both ends, and the cross sectional shape is typically circular or slightly oval. However, the tubular container can have any cross-sectional shape. The removable fasteners can simply be a rope or a wire tied around the outside of the container maintaining the shape of the container. Alternatively, the container can be fastened with staples, cable ties, grommets, tapes or plastic screws or other removable fasteners.

In one embodiment the overlapped edges of the rectangular sheet of material are fastened with a lace. Opposed edges of the rectangular sheet are each modified with evenly spaced opposed holes. The opposed edges modified with the holes are brought into contact and the opposed holes are aligned. A fastening lace is then laced through the aligned holes to afford a tubular container that is open on the top and on the bottom, FIG. 4. The lace can be a metal pin, a plastic pin, a string, a rope, a cable tie, or a wire. It is also contemplated that the holes may be laced without being aligned, similar to how opposing holes are laced in footwear.

The thickness of the sheet used to make a tubular container can be 10 to 1000 mils. When an organic polymeric material is used to form the tubular container certain physical properties of the polymer are necessary to maintain the integrity of the fastened tubular container once filled with soil with a growing tree over a growing period. Typically, this requires a material that is at least 10 mils thick, more specifically 20 to 40 mils thick, with a Young's modulus of about 0.2 to about 2.6 gigapascals, and a tensile strength of about 10 to about 80 megapascals.

Exemplary organic polymers include, but are not limited to, polyethylene, polypropylene, polycarbonate, polyester, polystyrene, polyacrylonitrile-butadiene-styrene, polybutadiene copolymers, and nylons. The organic polymer can comprise UV stabilizers, thermal stabilizers, pigments, inorganic fillers, or other polymers or copolymers.

The size of the tubular container can vary, but the most commercially desired tubular container size is about 1 to about 3 feet in length and about 4 to about 9 inches in diameter, with a wall thickness of about 5 to about 40 mils. In one embodiment the size of the tube is about 2 feet in height and about 6 inches in diameter with a wall thickness of about 20 to about 40 mils.

In one embodiment the tubular container can be made out of biodegradable material. A rectangularly shaped biodegradable material, with a length to width ratio of about 0.3 to about 3.5, that is 10 to 2000 mil thick, can be shaped into a tubular container with an open top and an open bottom by overlapping opposed edges and fastening them together, to afford a tubular container with a length to diameter ration of about 1 to 1, to about 10 to 1. The rectangularly shaped biodegradable material need not necessarily be flat, and the tubular container may have any cross-sectional geometric shape. However, the most practical material would be essentially flat, such that a tube with an open top and open bottom would be formed when the opposed edges of the sheet of biodegradable are overlapped and fastened in some manner. The method of fastening the overlapping opposed edges can be the same as described above with regard to the organic polymer.

Figure 1:
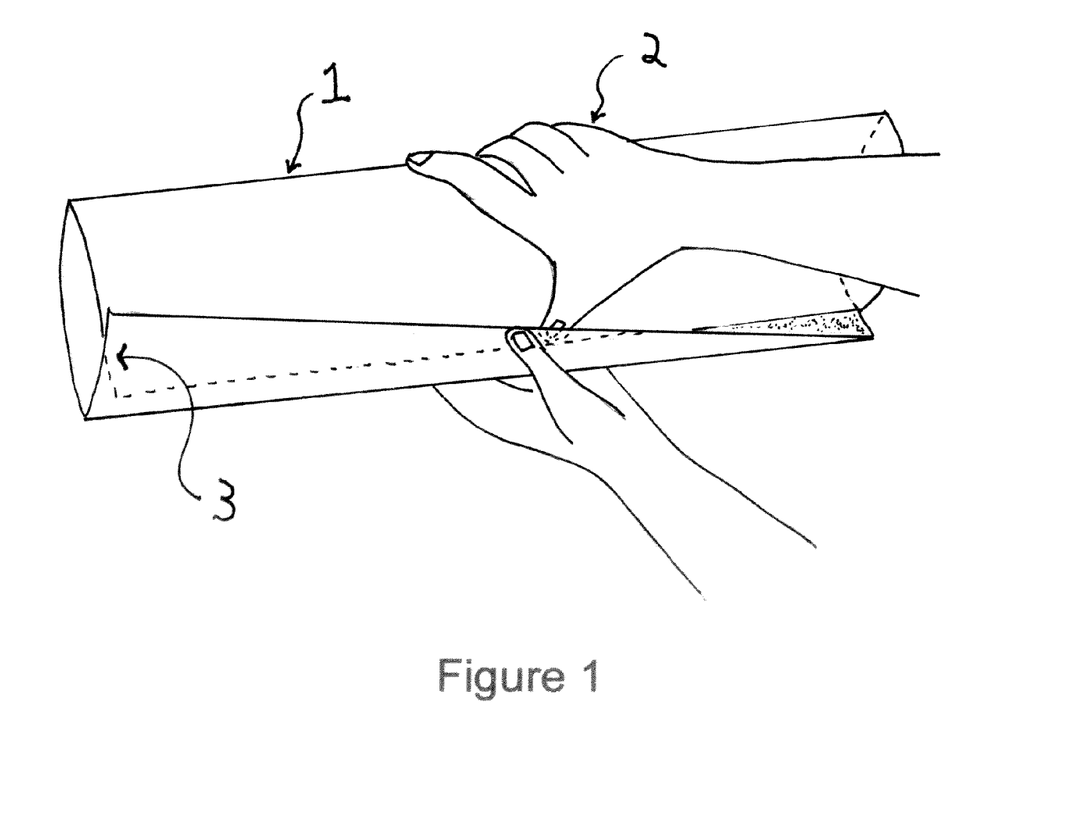
FIG. 1 depicts a rectangular sheet being rolled by hand into the shape of a tube with an open top and open bottom.
Figure 2:
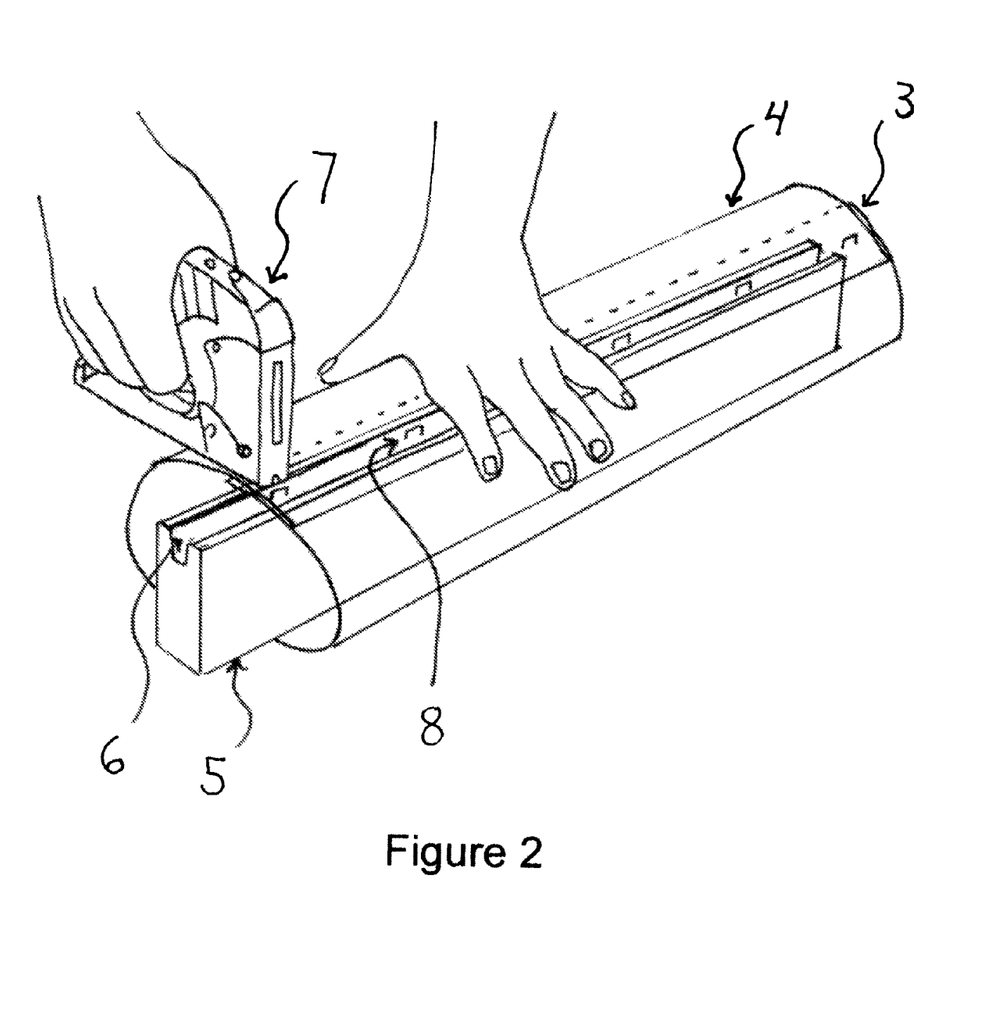
FIG. 2 depicts fastening the overlapping edges of the rectangular sheet with staples.

Turning now to the Figures, the tubular container is fabricated from a flexible flat sheet of material (FIG. 1, 1). The sheet is rolled by hand (FIG. 1, 2) to form a cylinder by overlapping the opposed edges (FIG. 1, 3) of the sheet. The cylinder has an open top and an open bottom. The cross-sectional shape of the tubular container is circular or slightly oval. The rolled sheet (FIG. 2, 4) is then manually laid on its side on a surface, with the over lapping edges facing up (FIG. 2, 3). A short piece of lumber (FIG. 2, 5) is slid inside of the tube. The piece of lumber has been modified to include a centered channel (FIG. 2, 6) that runs the length of one of the sides of the lumber. The channel depth and width is chosen to allow the staples to penetrate the overlapping edges but not the lumber. The piece of lumber is placed inside the tube resting on the edge that does not bear the channel. A hand held stable gun (FIG. 2, 7) capable of delivering a metal staple (FIG. 2, 8) can be used to secure the overlapped edges of the sheet (FIG. 2, 3). Three to eight evenly spaced staples are used along the length of the tube to secure the overlapping edges of the sheet together. The crown of the staple is snug against the material. The ends of the staples can be bent towards the inside wall of the tubular container with a suitable tool. The piece of lumber initially used to fasten the tube together can be employed to bend the legs of the staple. It is also contemplated that a metal bar with a groove can be used in place of the grooved lumber to bend the legs of the staple as the staple is delivered.

In another embodiment of the invention the overlapping edges (FIG. 3, 3) of a rectangular sheet of material (FIG. 3, 1) are held in place with a plastic cable ties (FIG. 3, 9) of suitable dimensions (cable ties sold by BuyHeatShrink in Essex Falls, N.J.). The top and the bottom of the tube are open.

Figure 4:
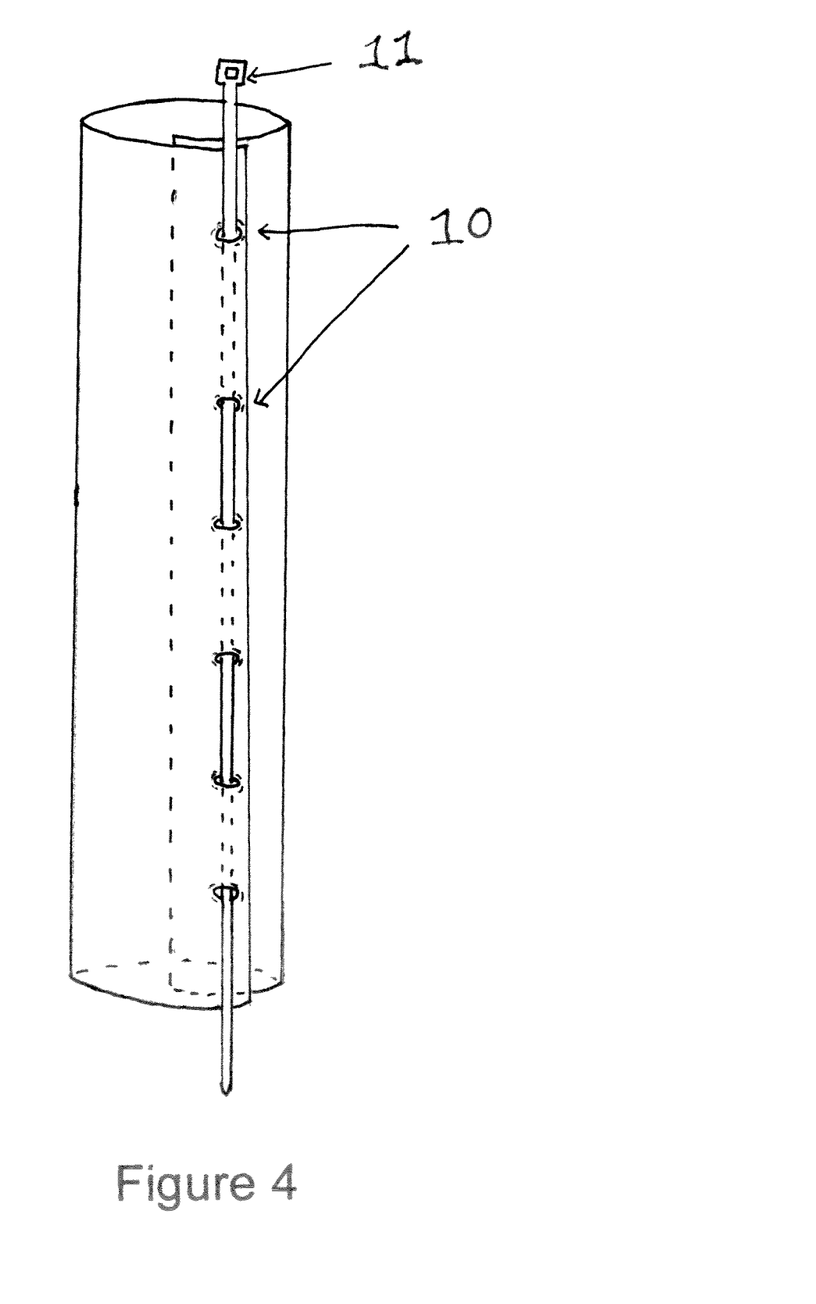
FIG. 4 depicts fastening the overlapping edges of a rectangular sheet by placing a lace, made of a cable tie, through a plurality of overlapped holes evenly distributed along two opposed overlapping edges of the sheet.

In another embodiment, a tubular container was fabricated from a flexible flat sheet with six evenly spaced holes punched along two opposed sides, at the same distance from top of the sheet. The two opposed sides modified with holes were then overlapped, and the opposed holes were aligned (FIG. 4, 10). A cable tie (FIG. 4, 11) was used to secure the overlapped sides to afford a tubular container with an open top and an open bottom (FIG. 4).

In yet another embodiment, organic polymeric pellets can be extruded and cut by know methods to form tubes with an open top and open bottom, with a cross-sectional shape that is circular, oval, or square. The extruded tube may be modified with a perforated rip section for easy removal of the tube during the transplanting of the tree.

The tubular container is stood on end upon a porous media (FIG. 5, 12), and is partially filled with soil (FIG. 5, 13) and water. In one embodiment, the porous media is a soil media. A tree seeding (FIG. 5, 14) is then planted inside the tubular container, wherein the tree root structure (FIG. 5, 15) is surrounded by soil. Soil is added to the container to properly cover the root flair. Typically the level of the soil in the tubular container is about 2 to about 12 inches from the top of the container, about 2 inches being the optimal distance. In yet another embodiment, a non-native tree seed, a native tree seed, or germinated seed can be planted in the tubular container, wherein the distance of the soil surface inside the tube is about 2 to about 12 inches from the top of the tube, more specifically 2 to 4 inches from the top of the tubular container. This creates a reservoir in the top of the tube that can be filled with water which then slowly percolates into the body of soil contained in the tubular container. This results in a more efficient use of water.

Figure 5:
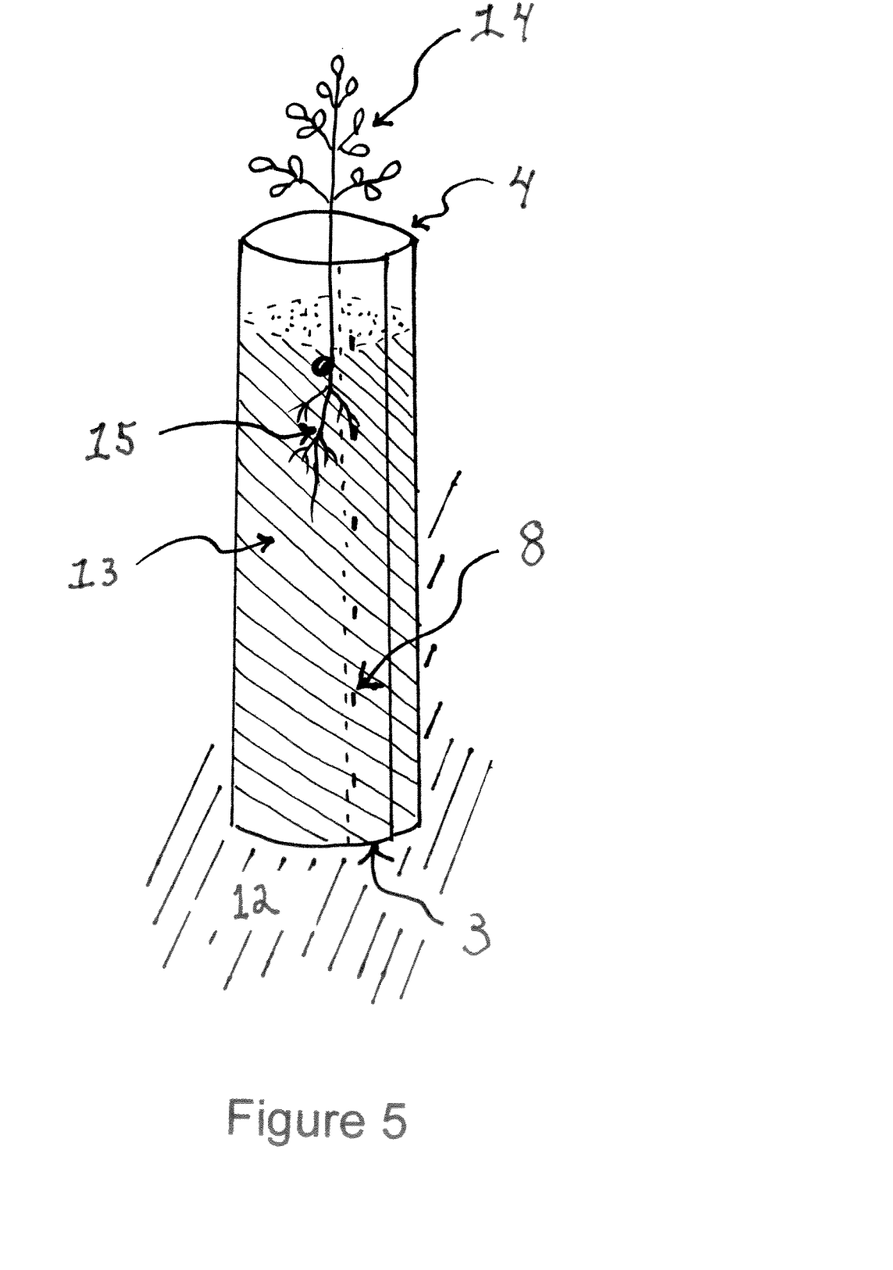
FIG. 5 depicts a tubular container with removable fasteners containing soil and a planted tree seedling.
Figure 6:
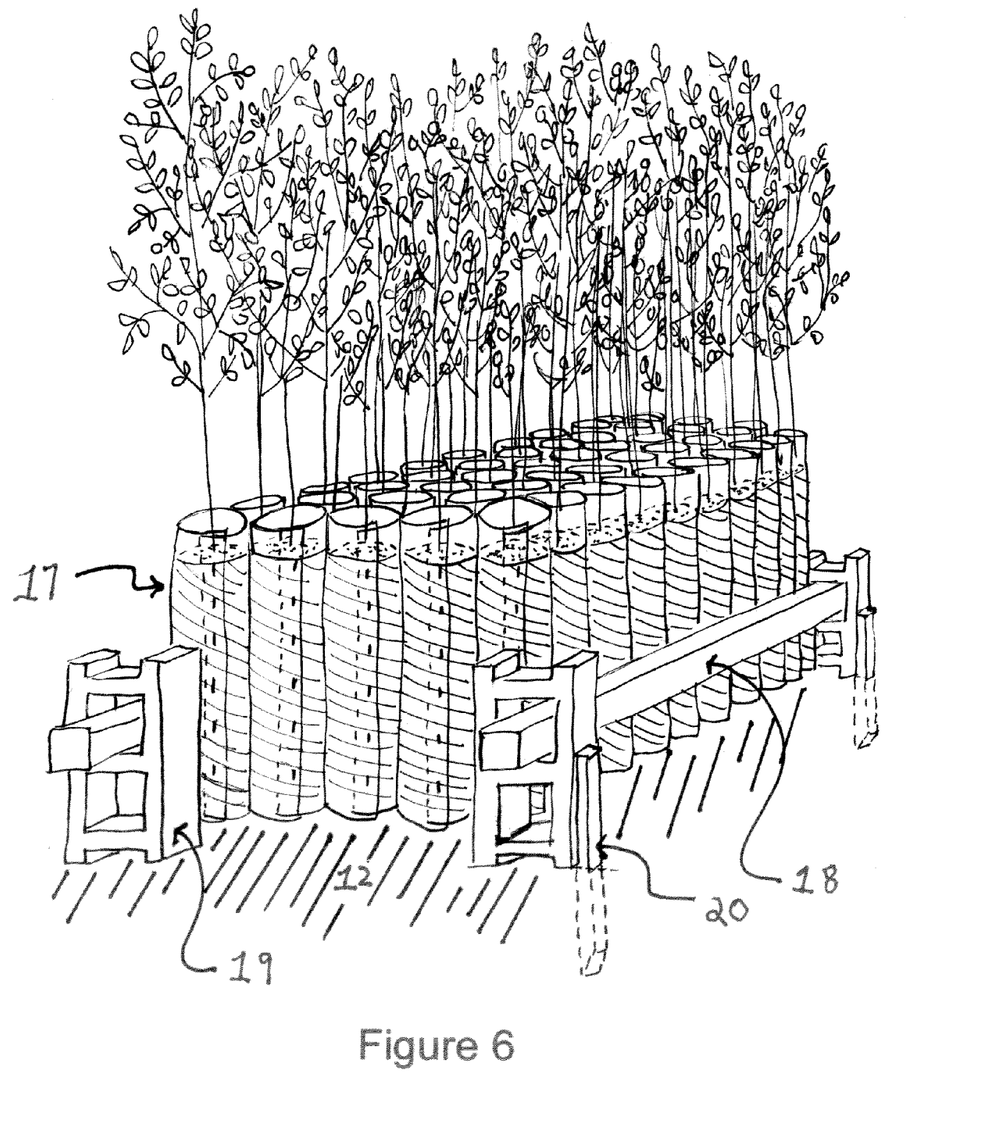
FIG. 6 depicts a section of 50 removable tubular containers containing soil and 2 to 3 year old young trees standing on a soil media.

The empty tubular containers can be stood upright and closely arrayed together to conserve space. For example, the tubular containers, standing on the surface of a porous media that is a soil media (FIG. 6, 12), are arrayed in 20 rows, each row containing 5 tubes (FIG. 6, 17); such an array will be called a 'section'. The dimensions of the array can be variable, but to manage the trees by species and for easy access to the tubular containers, a row length of 5 containers is desirable. A four foot distance between the sections also allows for easy access to care for and eventually remove the trees; this distance can also vary. The tubes are butted up against one another. The section of tubes can be supported in their upright position with earthen berms, or with lumber (FIG. 6, 18). The lumber can be braced in the cavities of cement blocks (FIG. 6, 19). The blocks can be held in place with stakes driven into the ground (FIG. 5, 20).

The tubular containers are then filled with local (native) soil containing 5% to 95% clay when planting the tree seed, germinated seed, or tree seedling in the container. The soil can be augmented with black dirt, loam, humus peat moss, or sand, but is not necessary. FIG. 6 shows trees that have been growing in the removable tubular containers for 2 years.

Sections of tubular containers can be situated in structures covered with a synthetic shade cloth. Shade cloth of the type sold by A.M. Leonard is suitable for this purpose (catalog number KSB30, KSB40, and KSB50). The shade cloths provide 30 to 50% shade (i.e., 30 to 50% of the incident sun light does not penetrate the cloth). Trees grown in some shade are not subjected to intense sun and don't dry out as rapidly. Additionally, the soil in the tubular containers retains water longer in the shade and requires less frequent watering. The shade cloth can be supported by wooden or metal posts that are connected at the top with wooden or metal beams. The shade cloth can be anchored to the beams with cable ties, rope, grommets, or anchored slats.

The tubes are watered periodically to keep the soil moist throughout the growing period in the tubular containers. Typically, 1 to 2 inches of water is added to each tubular container once per week for this purpose. Given the close proximity of the tubular containers, it is easier and more convenient to water a large number of tubes at the same time. Any number of known watering systems can be used to water sections of trees: overhead watering systems, irrigating systems, or simply watering with a hose by hand.

The close proximity of the trees in arrayed sections facilitates the application of micronutrients, fertilizers, insecticides and fungicides to aid the growth of the tree during the period the trees are allowed to grow in the tubular containers.

The tree is allowed to grow for about one to about three years, resulting in a tree that is about one to about five feet (or more) in height with a well formed root structure that extents at least half way down the tube. The root growth is forced to the bottom of the tube, by virtue of the container construction. The roots of the tree may extend into the porous media upon which the tubular container stands. Allowing the roots to grow into the porous surface encourages the growth of long well formed untangled roots, without the presence of girdling roots. Trees that normally grow long tap roots such as walnut and Bur oak are encouraged to grow well formed tap roots in the tubular container.

Figure 7:
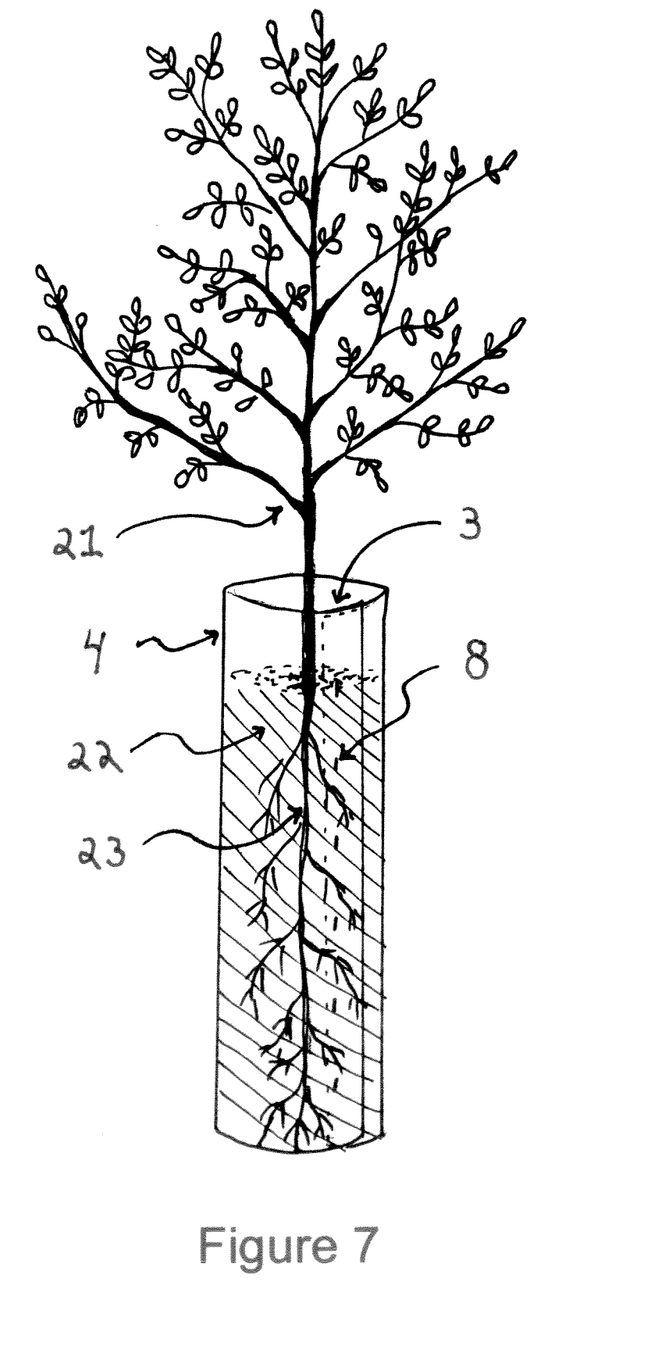
FIG. 7 depicts a 3 year old tree in a removable tubular container that has been separated from a growing surface ready for permanent planting.

After about a 1 to about a 3 year time frame the tubular container containing a tree that is about 2 feet to about 5 feet, or more, in height is separated from the surface of the porous media, typically without significantly disturbing the soil cylinder inside the tubular container. In one embodiment a tree grown in a tubular container standing on a soil media for 3 years can be removed from a soil surface with a foot-driven shovel with a sharp edge, cutting any roots that have grown into the soil with the edge of the shovel. Any roots protruding from the bottom of the container can be pruned flush with the bottom of the container to provide a marketable tree (FIG. 7, 21). Growing the tree in a tubular container provides a tree in a soil cylinder (FIG. 7, 22), with a well formed untangled root structure (FIG. 7, 23), that is a convenient weight for marketing, transporting, and planting. The tubular container containing the tree is handled carefully during the steps of separating the container from the surface or the porous media, transporting the tree in the container to the permanent planting site, and planting the tree, thus minimizing any damage to the fine microscopic root structure that provides for the collection and distribution of nutrients to the tree. The tree growing in the tubular container can be marketed in the second through fourth year of growth. Typically the tree is sold after leaf drop in the fall or before bud break in the spring.

A tree grown in a tubular container can be permanently planted by drilling a cylindrical hole at the planting site with an inexpensive single-person operated power auger (such as the Earthquake E43 with an eight inch earth auger, sold by Ardisam, Inc. of Cumberland Wis.) or a manually operated posthole digger. The soil at the permanent planting site should be moist as this facilitates the ease of drilling or digging the hole. The depth of the hole is essentially equal to the length (within an inch) of the soil cylinder in the tubular container, and is at least 2 inches greater in diameter than the tubular container.

Figure 8:
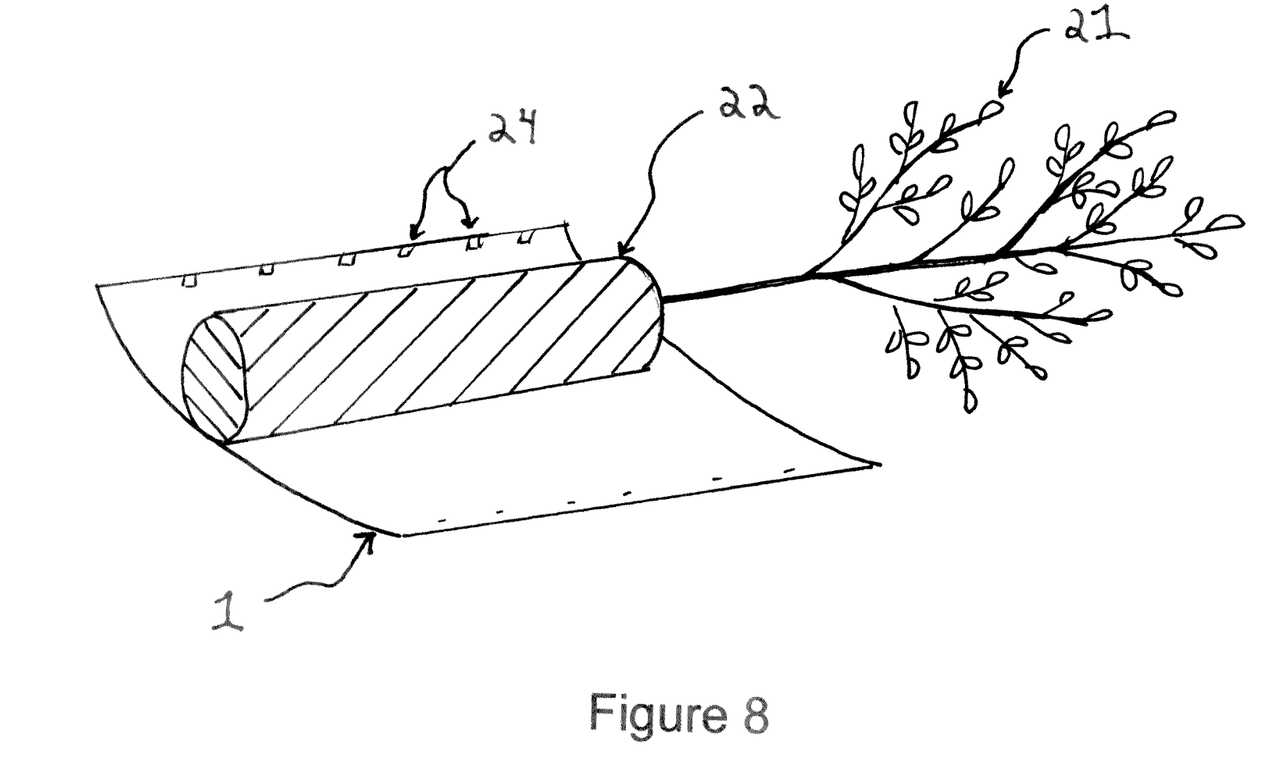
FIG. 8 depicts a tubular container containing a 1 to 3 year matured tree lying on its side, wherein the overlapping edges of the sheet used to fabricate the container have been unfastened, allowing the sheet to lay relatively flat.

To permanently plant a tree grown in a removable tubular container that is open on the top and open on the bottom, fastened with staples, cable ties, grommets, tape, plastic weld, rope, wire, tape or screw, the container is first laid on the ground on its side (FIG. 8). The fasteners are unfastened with an appropriate tool, allowing the contacting opposed edges of the sheet used to fabricate the tubular container to disengage. The sheet used to make the container is no longer in a tubular shape and unfolds into a sheet (FIG. 8, 1). FIG. 8 shows the staples (FIG. 8, 24) disengaged from the opposed edge. The sheet (FIG. 8, 1) is preferably not allowed to move in relation to the soil cylinder (FIG. 8, 22), and the tree (FIG. 8, 21) and soil cylinder are not disturbed to the extent that the tree is damaged.

Figure 9:
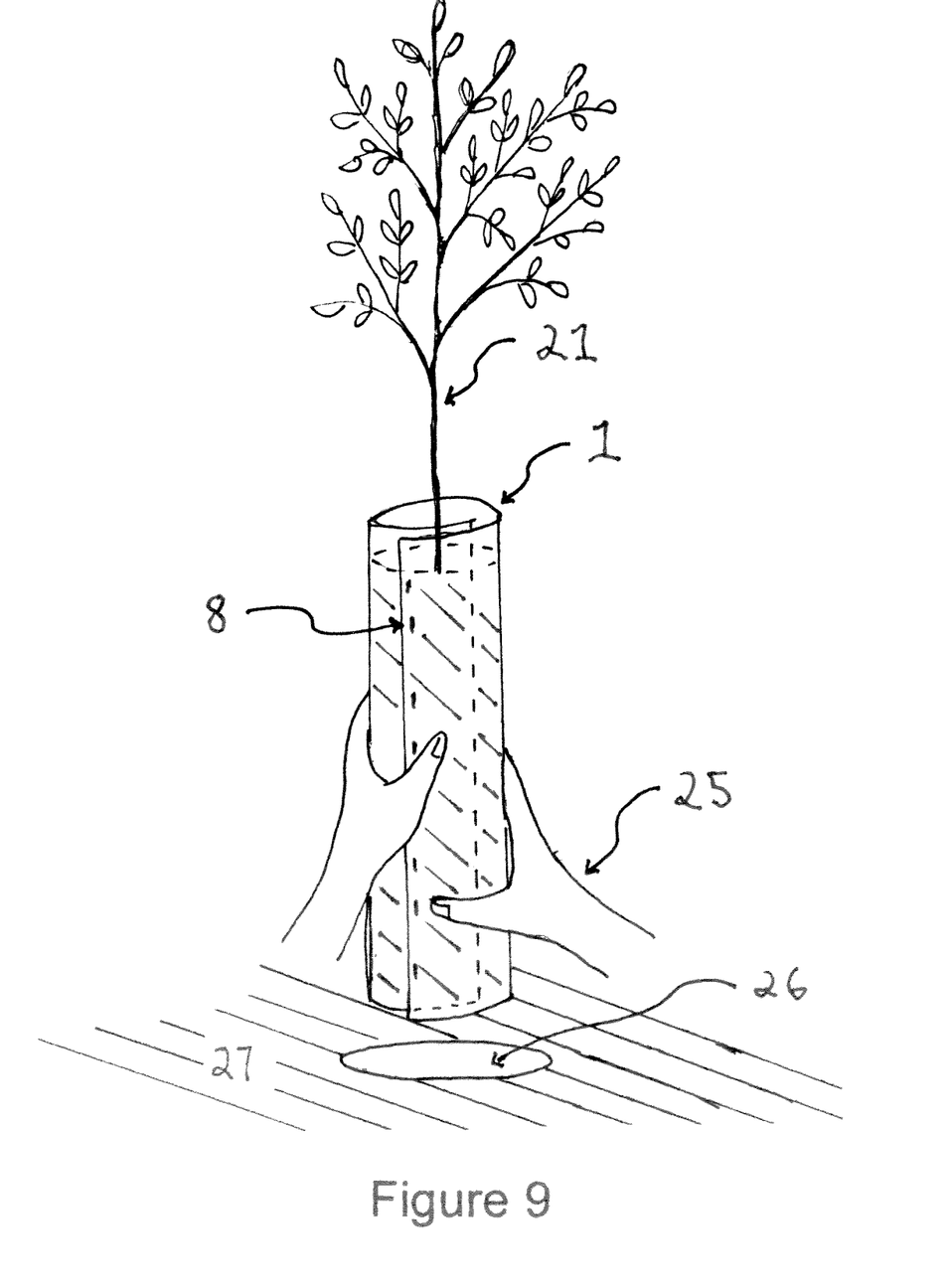
FIG. 9 depicts a soil cylinder being supported by manually holding a sheet of material firmly around the soil cylinder for the purposes of planting the tree.

Preferably the moisture content of the soil in the tubular container is such that the soil does not fall off the root structure and maintains its cylindrical form once the removable container is opened. FIG. 9 depicts the sheet (1), with staples unfastened (8), being hand-wrapped (25) around the soil cylinder containing the tree roots. In this way, the sheet is used to support the soil cylinder, and prevents the soil around the root structure from separating from the soil cylinder. The sheet of material held around the cylinder of soil is lowered as a unit into the hole (FIG. 9, 26) that had been dug into the ground (FIG. 9, 27), until the bottom of the soil cylinder rests on the bottom of the hole. If the trunk of the tree is not completely straight in relation to the sides of the tube, then the tree should be 'leaned' into the prevailing wind direction as the cylinder of soil containing the root structure is lowered into the hole. The plastic sheet can be slowly removed so that the cylinder of soil is not significantly disturbed. The annular space between the cylinder of soil and the wall of the hole is then filled with the soil that was removed to form the hole in the earth. This fill soil should be finely divided and free flowing to facilitate the filling of the annular space. Water is added to the annular space to help settle the soil into the hole. Additional soil and water are added to the hole until the hole is adequately filled.

It is advantageous to prune any roots that protrude from the bottom of a tubular container before permanently planting the tree. This prevents the roots from becoming bent and damaged when the soil cylinder is place in the hole, and reduces the formation of a tangled root system as the tree continues to grow.

To permanently plant a tree grown in a removable tubular container fabricated as shown in FIG. 4, a cylindrical hole is dug that is about 2 inches greater in diameter than the tubular container and is as deep as the soil cylinder in the tubular container. The tubular container, containing the tree, is then lowered into the hole, until the bottom of the soil cylinder rests on the bottom of the hole. The fastening pin is manually pulled out of the overlapping holes in the sheet of material used to fabricate the tubular container. This sheet of material can now be manually removed from the hole without significantly disturbing the soil cylinder. The annular space between the cylinder of soil containing the well formed untangled root system of the planted tree and the wall of the hole is then filled with the soil that was removed to create the hole. This fill soil should be finely divided and free flowing to facilitate the filling of the annular space. Water is added to the annular space to help settle the soil into the hole. Additional soil and water are added to the hole until the hole is adequately filled.

The depth of the hole and the amount of fill soil should be adjusted to insure that the root flair is just covered with soil. A tree planted wherein the root flair is exposed or the trunk of the tree is covered with more than about an inch of soil may fail to thrive.

Surprisingly growing a tree in a tubular container using the methods described herein results in a well developed root structure that increases the growth rate of the tree once permanently planted compared to a bare-rooted tree or a tree grown in a standard container or a soil grown tree that was dug up with roots trimmed and burlaped or potted. A 2 to 5 foot high tree, with about a 12 to 20 inch long root system, grown in a tubular container that is about 2 feet long and about 6 inches in diameter, with an open top and open bottom, standing on a porous media, such as soil, will grow better and faster than a more expensive 6 to 12 foot tree with a 1 to 1.5 foot diameter root ball structure. The root system of the tree grown in a tubular container is more than sufficient to support the rapid growth of the tree after the tree has been planted. This is not always the case with a tree grown in a container that has a bottom, or a tree dug from the ground where the root ball is significantly reduced upon trimming to a manageable size before marketing. Trees grown in containers that have bottoms frequently have short tangled root systems, and once planted may require one to two years of development before it can support rapid growth above ground. The root system of a tree grown by the methods described herein is typically 20 inches long and the tree above the surface is about two to about five feet, or more, in height. This ratio of root length to tree height is one of the reasons that trees grown in tubular containers thrive after permanent planting. Once the tree raised in a tubular container is planted, the tree has such an adequate undamaged root system, that rapid growth in encouraged without the need for the root system to reestablish itself.

Different tree species were grown from a germinated seed in a tubular container that is about 2 feet long and about 6 inches in diameter that is filled with about 22 inches of native soil in Posey County Ind., standing on a porous media, wherein that media is a soil media, wherein the growing trees are watered to keep the soil in the tubular containers moist and protected by shade cloth during the growing period. Table 1 shows the length of the root system as a function of growing time (a value of >22 inches indicates that the roots of the tree have grown into the soil media upon which the tubular container stands).

TABLE 1

Root Length of Trees After Growing a Germinated Tree Seed in a Tubular Container That is About 2 Feet Tall and 6 Inches in Diameter.

| Tree Type (Common Name) | Root Length After 1 Year (inches) | Root Length After 2 Years (inches) | Root Length After 3 Years (inches) |
|---|---|---|---|
| Bur Oak | 11 to 20 | 20 to >22 | >22 |
| Bald Cypress | 10 to 15 | 15 to >22 | >22 |
| Dawn Redwood | 10 to 15 | 15 to >22 | >22 |
| Sugar Maple | 8 to 12 | 12 to 20 | 18 to >22 |
| Ginkgo | 8 to 12 | 12 to 20 | 18 to >22 |
| Pecan | 8 to 12 | 10 to 20 | 18 to >22 |
| Ohio Buckeye | 6 to 12 | 8 to 18 | 15 to >22 |

The sheet of plastic used to form the removable tube container of the invention can be reused, if it is not damaged, to make another tubular container for growing trees.

The advantages of the invention are illustrated in the following non-limiting Examples.

EXAMPLES

Example 1

Construction of a Tubular Container that is about Two Foot Long and about 6 Inches in Diameter Fastened with Metal Staples A four foot wide, 500 foot roll of polycarbonate film, 40 mil thick, masked with a protective thin film of polyethylene on both sides, was cut into 24 inch×21 inch rectangular sheets. The polyethylene masking was removed from one side of the cut sheet. The sheet was rolled by over-lapping the opposed edges of the sheet (with the masked side on the outside of the tube) that are 21 inches in length to form a tube that was approximately 6 inches in diameter and is 24 inches in length. The overlapping edges of film were stapled together with 6 evenly spaced 12 mm long by 9 mm wide metal staples (Arrow Fastener Co., Inc., Product Code #508), delivered by a hand held staple gun (Arrow Model T50P) with the aid of a wood guide as shown in FIG. 2, to form a tubular container with an open top and an open bottom. The head of the staple was snug against the plastic. The legs of the staples were then bent towards the inner sides of the tube with the wood guide. The tube, when stood on end on a soil media, filled with soil, planted with a tree seed or tree seedling, and watered periodically, maintained its structural integrity for the 1 to 3 year growing period of the tree seedling.

Example 2

Figure 3:
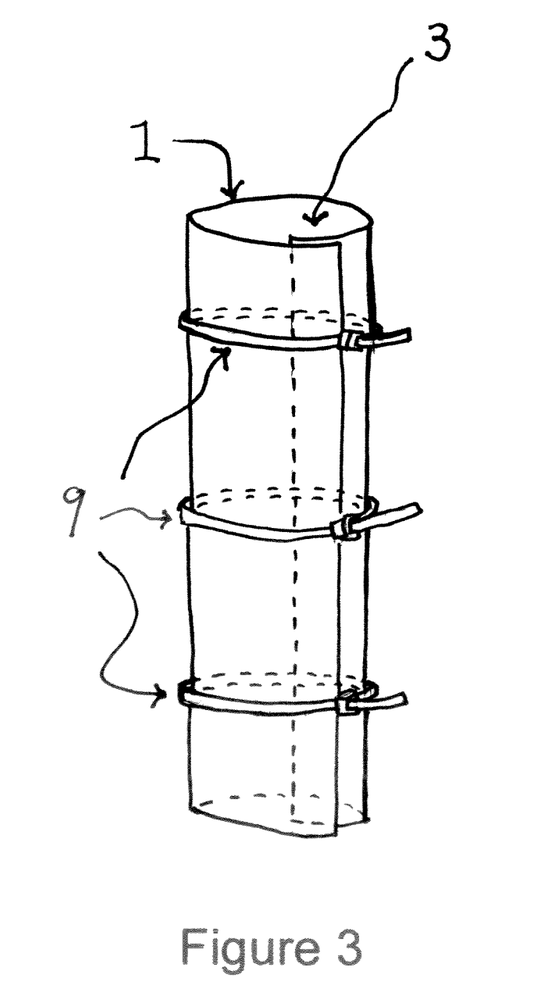
FIG. 3 depicts fastening the overlapping edges of a rectangular sheet with cable ties.

Construction of a Two Foot Long by 6 Inch Diameter Tube Fastened with Cable Ties Three 29 inch long cable ties (catalog number CT272, 9 mm wide, from CableTiesAndMore.com) were secured about the outside circumference of the tubular container made in Example 1. The cable ties were then slide off the outside of the tubular container. The cable ties that had been removed had a loop diameter of approximately 6 inches. A 24 inch by 21 inch rectangular 40 mil thick sheet of polycarbonate film of Example 1 was tightly rolled by hand into a 24 inch high tube by overlapping the edges. The diameter of the roll was less than 5 inches. The three pre-lopped cable ties were then slide over the ends of the hand-held tightly rolled sheet. The sheet was released and the sheet unrolled to the diameter of the cable tie loops. The opposed edges of the sheet overlapped by about 2 inches. One cable tie was approximately 3 inches from the top of the tube, one approximately 3 inches from the bottom of the tube, and one approximately in the middle of the tube. Thus, a tubular container that was two feet high and about six inches in diameter, fastened by three cable ties was produced (FIG. 3). The tube, when stood on end on a soil surface, filled with soil, planted with a tree seed or tree seedling, and watered periodically, maintained its structural integrity for the 1 to 3 year growing period of the tree seedling.

Example 3

Construction of a Two Foot Long by 6 Inch Diameter Tube Fastened with a Removable Pin A four foot wide, 500 foot roll of polycarbonate film, 40 mil thick, masked with a protective thin film of polyethylene on both sides, was cut into 24 inch×21 inch rectangular sheets. The polyethylene masking was removed from one side of the cut sheet. Six evenly spaced ⅜ inch diameter holes were punched along one of the 24 inch edges; the distance between center of the hole and the edge of the sheet was 0.5 inches. Six ⅜ inch diameter holes were also punched on the opposite 24 inch edge of the sheet; these holes were spaced along the edge exactly as spaced on the opposite edge; the center of these holes were 2 inches from the edge of the sheet. The sheet was rolled by over-lapping the 24 inch opposed edges of the sheet (with the masked side on the outside of the tube) to form a tube that was approximately 6 inches in diameter and was 24 inches tall, wherein the ⅜ holes on each 24 inch edge overlapped. A 29 inch long cable tie (catalog number CT272, 9 mm wide, from CableTiesAndMore.com) was then threaded though the overlapping holes such that one end of the cable tie protrudes from the bottom of the tubular container and the other end protrudes from the top end of the tubular container (FIG. 4). The cable tie serves the purpose of a removable pin.

Example 4

Placement of Tubular Containers and Filling Tubular Containers with Soil

Tubular containers made as described in Examples 1 through 3 were stood on end, on a leveled soil media; in this case leveled ground. The leveled earth did not contain any material that would inhibit root growth, such as alkaline soil, highly acidic soil, rock, foreign obstructions, or other toxic material. The tubular containers were arrayed in rows of five, and the tubes were abutted against a neighboring tube. Twenty rows of tubes were in each section (100 tubes). Each row was abutted against its neighboring row. The tubes were braced together with 4 inch by 4 inch by 10 to 12 foot pieces of lumber. The lumber was braced in the cavities of 8 inch by 8 inch by 16 inch cement blocks. The cement blocks were braced with stakes driven into the ground at the base of the cement blocks. The stake that protrudes above the ground abuts the outside of the cement block, see FIG. 6. The end of the section of tubular containers was bermed with a six inch high mound of soil. The tubular containers were then partially filled with local soil. Water was added to the tube to settle the soil in the tube. Soil was added to the tube such that the level of soil in the tube was from 2 inches to 12 inches from the top of the tube. Twenty sections of tubes were constructed. The sections of tubes were situated under 40% shade cloth from AM Lenard, catalog number KSB40. The shade cloth was suspended 8 to 10 feet above the top of the tubular containers.

Example 5

Planting and Growing Bare Root Trees in the Tubular Containers

One or two year old bare root trees can be purchased from commercial nurseries. Soil was removed from the center of the soil filled tube of example 4 with a bulb planter, such that the hole could accommodate the entire length of the root of the tree. The tree root was placed in the hole within the tubular container. The seedling was hand-held in place such that the end of the roots were 1 mm to 3 cm from the bottom of the hole. Free flowing soil was then added to the tube to fill the hole that was made to plant the seedling. Enough soil was added to the tubular container to just cover the root flair. No more than 1 cm of the tree trunk was covered with soil. Water was applied to the top of the tubular container to settle the soil and to remove air pockets in the soil. Soil was added or removed from the top of the tubular container to properly cover the roots, but not cover the lower trunk of the tree seedling. The level of the soil in the tubular containers was 2 to 3 inches from the top of the tube.

One-year old bare root *Catalpa speciosa* (Northern Catalpa) were purchased from a commercial nursery. The roots were approximately 6 inches in length, and the tree trunks were 3 to 6 inches in height. In the spring, holes were dug in the top of the tubular containers, described in Example 4, to accommodate the root structure. Free flowing finely divided soil was then added to the hole to cover the roots as described above. The tubular containers were situated under a shade cloth and allowed to grow. The trees were periodically watered to keep the soil moist. Within one summer, the trees had reached about 2 feet in height with a well developed root system that extended nearly the length of the tubular container.

Example 6

Planting Germinated *Taxodium Distichum* (Bald Cypress)

Local Bald Cypress seed cones were collected in the fall. The cones were allowed to dry and then manually broken up to free the seeds. The seeds were then placed in paper bags and stored in an unheated outdoor structure for the winter. Aluminum trays were prepared that contained local soil mixed with loam or peat moss in a ration of 3:1 (soil:loam). The trays had small holes drilled in the bottom. The trays were 2 feet in length, 14 inches wide and 4 inches deep and contained the soil mix to a depth of 3.5 inches. In early spring, the seeds were broadcast on top of the soil contained in the trays. The seeds were covered with about 1 cm of soil mix. The soil was kept moist. The seeds germinated and were allowed to grow 2 to 4 inches high in height. The seedlings were then carefully removed from the tray, keeping the root structure intact and as undisturbed as possible. A small hole was dug in the top of the soil contained in the tubular container that was described in example 4. The hole was big enough to accommodate the root of the germinated seed. Free flowing soil was added to the hole to just cover the root. The level of the soil in the top of the tubular container was about 2 inches from the top of the container. The soil in the tube was keep moist. The tree seedling was monitored for several weeks to insure that the roots were adequately covered with soil and that the soil level did not cover the trunk of the tree.

Example 7

Care for the Growing Taxodium Distichum Tree Seedlings in Removable Tubular Containers The bald cypress seedlings of example 6 were watered periodically to keep the soil moist but not saturated. Micronutrients (e.g., chelated iron) were added to any tube that showed a tree suffering from chlorosis (an iron or manganese deficient tree). Imidichloprid (from BASF Corp) was applied to the soil of any seedling displaying the presence of any number of gall wasps present in Posey County, Ind. The trees were allowed to grow in the tubular containers for 1 to 3 years.

Trees that had grown in the tubular containers for 2 years were about two feet tall and the roots extended the length of soil contained in the tubular container. Trees grown in the containers for 3 years were about 3 to 5 feet in height and the root had penetrated the soil media upon which the tubular containers stood.

Example 8

Planting and Caring of Bald Cypress Trees Grown in Tubular Containers

Bald Cypress trees grown as described in example 7 for three years had a well developed root structure. In late November, the tubular container that was 2 feet tall and 6 inches in diameter was separated from the soil surface upon which it stood with a shovel with a sharp edge forced underneath of the tubular container. Any roots that had grown into the soil surface upon which the tubular container stood were severed by the edge of the shovel. Once the tubular container was separated from the soil surface, any roots that protruded from the bottom of the container were pruned even with the bottom of the tube with pruning shears. The weight of the separated tubular container containing the soil cylinder and tree weighed between 30 and 45 pounds. A cylindrical hole was dug at the permanent planting site that was 8 to 9 inches wide and as deep as the height of the soil cylinder in the tubular container containing the tree. The cylindrical hole can be dug with a manual post hole digger or bored with an inexpensive power auger with an 8 inch diameter drill bit (such as the 'Earthquake®' E43 Earth Auger sold by Ardisam, Inc., USA with a EA8F 24 inch long, 8 inch wide earth auger).

The separated tubular container, fastened with staples, containing the tree was laid on its side and the overlapping edge was gently pulled apart to release the staples. If the tube had been fastened with cable ties, the cable ties were slide off the outside of the tube on the bottom end of the tube. The cable ties were reused to make new tubular containers. The polycarbonate film was then laid open to expose the cylindrical of soil (FIG. 8). The cylinder of soil was centered on the sheet. The cylinder of soil was gently rolled back and forth over the sheet, an inch in either direction, to insure that the soil cylinder had not adhered to the polycarbonate sheet, but the position of the cylinder of soil remained in the center of the sheet and the bottom of the soil cylinder was even with the bottom of the sheet. A person then manually wrapped the polycarbonate sheet around the soil cylinder using both hands (FIG. 9). The sheet supported the soil cylinder as the soil cylinder and sheet were then dropped into the hole taking care to center the soil cylinder in the hole. The bottom of the soil cylinder rested on the bottom of the hole. The annular space between the soil cylinder and the sides of the hole was then filled in with finely divided free flowing soil. Water and soil were added to the annular space until the space was filled with soil. Care was taken to make sure that the root flair was covered with soil and not more than an inch of loose soil covered the trunk of the tree.

The tree was then properly mulched to retard the growth of weeds or grasses within four feet of the trunk of the tree. The mulch was 1 inch in depth. Weeds and grasses growing within 4 feet of the tree trunk were periodically controlled with the proper application of Roundup® herbicide. The tree was watered once per week during dry weather. The tree was protected from animals, mowers, and weed trimmers with a wire cage that was 3 feet high and 2 feet in diameter made from welded wire fencing fabricated from 14 gauge wire, with a rectangular mesh size of 2 inches by 4 inches. The tree grew to a height of about 8 feet in 3 years in Posey County, Ind.

Example 9

Growing and Planting *Quercus Macrocarpa* (Bur Oak) Using Tubular Containers Fastened with a Removable Pin Acorns were collected from native tree stands in Posey County, Ind. in the fall. The acorns were heated in water at 120° F. for 40 minutes. Acorns that floated were discarded. A plastic tub, 12 inches in depth, 24 inches in diameter was filled with native soil to a depth of 9 inches. The heat treated acorns were placed over the entire surface of soil in the tub, two inches apart from one another and at least one inch away from the sides of the tub. One inch of a 50:50 mixture of peat moss and soil was placed on top of the acorns. A wire mesh was placed over the top of the tub and secured in place. The acorns in tub were over-wintered out of doors. The acorns germinated by early spring. Typically, the roots were 6 inches long, and the tree above the ground was 6 inches in height within 3 weeks from the emergence of growth above the surface of the soil. One hundred tubular containers that were 2 feet tall and 6 inches in diameter, made as described in example 3, were stood on a leveled soil surface and were partially filled with soil and water. A hole was dug in the soil contained in each of the containers with a bulb planter to accommodate the root of the germinated Bur oak seedlings. The holes were just deep enough to accommodate the entire length of the root structure of the germinated seed. The root that had emerged from the seed was placed in the hole and covered with soil, taking care to make sure the trunk of the tree was vertical and that the root flair was covered with soil. The acorn if still attached to the tree seedling was just covered with soil. The soil level inside the containers was about 2 inches from the top of the containers. The tubular containers were watered to keep the soil moist and the trees were allowed to grow under shade cloth. If necessary, soil was added to the top of the tubular containers to make sure that the root flair of the trees were covered with soil, taking care to make sure that soil did not cover more than one inch of the tree trunks.

After one year in the tubular container, the Bur oak trees were between 1 and 2 feet tall and the root was over one foot in length. After two years the trees were 3 to 3.5 feet in height and the root had grown the length of the tubular containers, and at times, the roots had grown into the soil surface upon which the containers stood. Trees kept for three years in the tubular containers developed roots that grew into the earth upon which the containers stood.

In early March, a tubular container containing a 3 year old Bur oak was separated from the soil surface upon which it stood by forcing a foot-driven shovel with a sharp edge underneath of the tubular container. Any roots that had grown into the soil surface upon which the tubular container stood were severed by the edge of the shovel. Once the tubular container was separated from the soil surface, any roots that protruded from the bottom of the container were pruned even with the bottom of the tube with pruning shears. The weight of the separated tubular container was between 30 and 45 pounds, a convenient weight for a single person to handle. An eight inch diameter cylindrical hole that was as deep as the height of the soil cylinder in the tubular container containing the tree was dug at a permanent planting site. The container was placed in the hole until the bottom of the tubular container rested on the bottom of the hole. The cable tie pin was then manually removed from the overlapping holes, allowing the overlapped edges of the sheet of material used to make the container to disengage from one another. The sheet of material used to make the container was manually removed from the hole. The annular space between the soil cylinder and the sides of the hole was then filled in with finely divided free flowing soil. Water and soil were added to the annular space until the space was filled with soil. Care was taken to make sure that the root flair was covered with soil and not more than an inch of loose soil covered the trunk of the tree.

Although the invention has been described with respect to the preferred examples, it should be understood by those skilled in the art that minor modifications can be made that do not depart from the spirit of the invention. Dimensions and weights used in this description are not to be taken as exact, and can vary and still fall within the spirit of the invention. The description of the invention and the examples of the invention are for illustrative purposes and should not be interpreted as limiting the scope of the invention.

The invention claimed is:

1. A method of growing a tree ready to plant comprising:
   providing a removable tubular container having an open top end and an open bottom end wherein the tubular container has a height of 1.5 foot to 3 feet, a diameter of 3 inches to 9 inches and a wall thickness of 15 mils to 80 mils;
   standing the bottom of the tubular container on a porous media and partially filling the tubular container with soil;
   planting a tree seed, a germinated tree seed, or a bare root tree seedling in the soil within the tubular container;
   adding soil to the tubular container to cover the seed, the root flair of the germinated seed, or the root flair of the tree seedling, wherein the height of the soil in the tubular container is a quarter inch to 8 inches from the top of the tubular container;
   maintaining the tubular container under growth conditions until the length of the tree root system extends into at least half of the height of soil in the tubular container and to any depth in the porous media upon which the tubular container stands, to provide a rooted tree;
   separating the bottom of the tubular container from the porous media; and
   trimming or not trimming any roots that protrude from the bottom of the tubular container flush with the bottom of the tubular container, to provide a tree ready to plant, rooted in soil contained in a tubular removable container.

2. The method of claim 1 wherein the added soil covers the seed to a depth of about 1 to about 5 cm, or the root flair of the germinated seed or the tree seedling to a depth of about 0.5 to about 2.0 cm.

3. The method of claim 1 wherein the removable tubular container comprises an organic polymer.

4. The method of claim 3 wherein the organic polymer comprises polyethylene, polypropylene, polycarbonate, polyamide, polyester, polybutadiene copolymers, poly styrene, or a combination comprising at least one of the foregoing; and optionally a particulate filler, antioxidant, heat stabilizer, light stabilizer, ultraviolet light stabilizer, colorant, or a combination comprising at least one the foregoing.

5. The method of claim 1 wherein the removable tubular container has a cross-sectional area that is circular or slightly oval.

6. The method of claim 1 wherein the tree ready to plant has a total weight of 10 to 30 kg.

7. The method of claim 1 wherein providing a tubular container comprises:
   overlapping two opposing ends of a rectangular sheet of material to make a tubular form; and
   fastening the overlapped edges with a removable fastener.

8. The method of claim 7 wherein the removable fastener comprises a metal staple, a corrosion resistant metal stable, a cable tie, a wire, a lace, or a combination thereof.

9. The method of claim 7 wherein the removable fastener is a lace, and wherein the step of fastening the overlapped edges with a removable fastener comprises:
   piercing the opposed edges of the flexible sheet to produce a first plurality of fastening holes at the first edge and a second plurality of fastening holes at the opposed edge;
   aligning the first plurality of fastening holes with the second plurality of fastening holes; and
   threading the lace through the aligned first and second pluralities of fastening holes.

10. The method of claim 9 wherein the lace comprises a metal pin, a plastic pin, or a plastic cable tie.

11. The method of claim 1 wherein the tubular container is an extruded tubular form comprising an organic polymer.

12. A method to plant the tree ready to plant produced by the method of claim 1 comprising:
   digging a hole at a planting site wherein the hole is at least about 1 inch wider than the diameter of the tubular container and as least as deep as the height of soil in the tubular container;
   inserting the soil cylinder of the tree ready to plant into the hole;
   removing the tubular container, and
   filling in the annular space between the soil cylinder and the sides of the hole with material comprising soil.

13. A method to grow and plant a tree comprising:
   piercing the opposed edges of the continuous flexible sheet made of an organic polymer to produce a first plurality of fastening holes at the first edge and a second plurality of fastening holes at the opposed edge;
   aligning the first plurality of fastening holes with the second plurality of fastening holes;
   threading a lace through the aligned first and second pluralities of fastening holes to provide a removable tubular container having an open top end and an open bottom end wherein the tubular container has a height of 1.5 foot to 2.5 feet, a diameter of 4 to 7 inches and a wall thickness of 20 to 50 mils;
   standing the bottom of the tubular container on a porous media and partially filling the tubular container with soil;
   planting a tree seed, a germinated tree seed, or a bare root tree seedling in the soil within the tubular container;
   adding soil to the tubular container to cover the seed, the root flair of the germinated seed, or the root flair of the tree seedling, wherein the height of the soil in the tubular container is a quarter inch to 8 inches from the top of the tubular container;

maintaining the tubular container under growth conditions until the length of the tree root system extends into at least half of the height of soil in the tubular container and to any depth in the porous media upon which the tubular container stands, to provide a rooted tree;

separating the bottom of the tubular container from the porous media;

trimming or not trimming any roots that protrude from the bottom of the tube flush with the bottom of the tube, to provide a tree ready to plant, rooted in a soil contained in a removable container that weighs 10 kg to 25 kg;

digging a hole at a planting site wherein the hole is at least about 1 inch wider than the diameter of the tubular container and as least as deep as the height of soil in the tubular container;

inserting the separated tubular container into the hole;

removing the lace from the plurality of holes;

removing the flexible sheet from the hole; and filling in the annular space between the soil cylinder and the sides of the hole with material comprising soil.

* * * * *